United States Patent
Blacksberg et al.

(10) Patent No.: US 11,760,221 B2
(45) Date of Patent: Sep. 19, 2023

(54) CHARGING SYSTEMS AND METHODS FOR AUTONOMOUS CARTS

(71) Applicant: A9.com, Inc., Palo Alto, CA (US)

(72) Inventors: Jacob Blacksberg, Boulder, CO (US); Matthew Ventimiglia, Lafayette, CO (US); Karl McDowall, Boulder, CO (US); Nima Keivan, Boulder, CO (US)

(73) Assignee: A9.com, Inc., Palo Alto, CA (US)

(*) Notice: Subject to any disclaimer, the term of this patent is extended or adjusted under 35 U.S.C. 154(b) by 1220 days.

(21) Appl. No.: 16/020,232

(22) Filed: Jun. 27, 2018

(65) Prior Publication Data

US 2018/0370377 A1  Dec. 27, 2018

Related U.S. Application Data

(60) Provisional application No. 62/525,338, filed on Jun. 27, 2017.

(51) Int. Cl.
*B60L 53/37* (2019.01)
*G05D 1/02* (2020.01)
(Continued)

(52) U.S. Cl.
CPC .......... *B60L 53/37* (2019.02); *B60L 3/04* (2013.01); *B60L 53/16* (2019.02); *B60L 53/305* (2019.02);
(Continued)

(58) Field of Classification Search
CPC .. H02J 7/0063; H02J 2007/0067; H02J 7/042; H02J 2007/10; H02J 7/125;
(Continued)

(56) References Cited

U.S. PATENT DOCUMENTS 6,046,565 A    4/2000  Thorne
6,917,893 B2   7/2005  Dietsch et al.
(Continued)

FOREIGN PATENT DOCUMENTS

EP    2940426 A1      11/2015
JP    H09191334 A  *  1/1996
(Continued)

OTHER PUBLICATIONS

Gálvez-López et al.,"Bags of binary words for fast place recognition in image sequences." IEEE Transactions on Robotics 28.5 (2012): 1188-1197.
(Continued)

*Primary Examiner* — Jerry D Robbins
(74) *Attorney, Agent, or Firm* — Eversheds Sutherland (US) LLP

(57) ABSTRACT

An autonomous robot moves materials in a warehouse or other industrial environment. It runs on an electric motor powered by a rechargeable battery. When its battery becomes depleted, it maneuvers to a nearby charger. It guides itself to the charger using visual cues, such as a target on or near the charger, until it establishes a good electrical connection with the charger. Proximity sensors on the charger and/or the autonomous robot determine if the autonomous robot is positioned properly; if so, the charger begins charging the autonomous robot's battery. While charging, the charger monitors the resistance of the electrical connection for open- or short-circuit conditions. It also monitors the status of the proximity sensors. If the charger detects an open-circuit or a short-circuit or that the autonomous robot has moved away from the charger, the charger stops charging.

17 Claims, 18 Drawing Sheets

(51) Int. Cl.

| | | |
|---|---|---|
| *G01V 3/08* | (2006.01) | |
| *B60L 3/04* | (2006.01) | |
| *G01V 3/02* | (2006.01) | |
| *B60L 53/30* | (2019.01) | |
| *B60L 53/31* | (2019.01) | |
| *B60L 53/16* | (2019.01) | |
| *G05B 19/418* | (2006.01) | |
| *H02J 7/00* | (2006.01) | |
| *B60L 53/62* | (2019.01) | |
| *B60L 53/66* | (2019.01) | |
| *B60L 53/60* | (2019.01) | |

(52) U.S. Cl.
CPC ............. *B60L 53/31* (2019.02); *B60L 53/60* (2019.02); *B60L 53/62* (2019.02); *B60L 53/66* (2019.02); *G01V 3/02* (2013.01); *G01V 3/081* (2013.01); *G05B 19/418* (2013.01); *G05D 1/0225* (2013.01); *G05D 1/0231* (2013.01); *G05D 1/0234* (2013.01); *H02J 7/0013* (2013.01); *H02J 7/00036* (2020.01); *H02J 7/0042* (2013.01); *H02J 7/0044* (2013.01); *H02J 7/00047* (2020.01); *B60L 2200/30* (2013.01); *B60L 2200/44* (2013.01); *G05D 2201/0216* (2013.01)

(58) Field of Classification Search
CPC .... H02J 7/0042; H02J 7/0027; H02J 7/00036; H02J 7/007; H02J 7/00047; B60L 53/62; B60L 53/66; B60L 3/04; B60L 53/305; B60L 53/31; B60L 53/16; B60L 53/37; B60L 11/1838; B60L 2200/44; B60L 2200/30; G01V 3/02; G01V 3/081; G05D 1/0234; G05D 1/0225; G05D 1/0231; G05D 2201/0216; G05B 19/418; Y02T 90/14; Y02T 10/7072; Y02T 90/12; Y02T 10/70; Y02T 90/16; Y02P 90/60
USPC ......................................................... 320/109
See application file for complete search history.

(56) References Cited

U.S. PATENT DOCUMENTS

| | | |
|---|---|---|
| 7,100,725 B2 | 9/2006 | Thorne |
| 7,431,115 B2 | 10/2008 | Thorne |
| 7,650,013 B2 | 1/2010 | Dietsch et al. |
| 7,693,654 B1 | 4/2010 | Dietsch et al. |
| 7,894,939 B2 | 2/2011 | Zini et al. |
| 7,912,633 B1 | 3/2011 | Dietsch et al. |
| 7,996,109 B2 | 8/2011 | Zini et al. |
| 8,010,230 B2 | 8/2011 | Zini et al. |
| 8,041,455 B2 | 10/2011 | Thorne |
| 8,200,423 B2 | 6/2012 | Dietsch et al. |
| 8,204,624 B2 | 6/2012 | Zini et al. |
| 8,548,646 B1 | 10/2013 | Gariepy et al. |
| 8,688,275 B1 | 4/2014 | LaFary et al. |
| 8,803,737 B2 | 8/2014 | Bush et al. |
| D717,208 S | 11/2014 | Stone et al. |
| 8,886,390 B2 | 11/2014 | Wolfe et al. |
| D722,281 S | 2/2015 | Stone et al. |
| D722,631 S | 2/2015 | Stone et al. |
| D722,632 S | 2/2015 | Stone et al. |
| 8,948,914 B2 | 2/2015 | Zini et al. |
| 9,020,679 B2 | 4/2015 | Zini et al. |
| 9,026,301 B2 | 5/2015 | Zini et al. |
| 9,069,794 B1 | 6/2015 | Bandukwala et al. |
| D736,117 S | 8/2015 | Stone et al. |
| 9,223,313 B2 | 12/2015 | Wolfe et al. |
| 9,245,305 B2 | 1/2016 | Wellington et al. |
| 9,559,461 B1 | 1/2017 | Diehr |
| 9,563,206 B2 | 2/2017 | Zini et al. |
| 9,592,609 B2 | 3/2017 | LaFary et al. |
| 9,592,969 B2 | 3/2017 | Wolfe et al. |
| 9,606,544 B2 | 3/2017 | Gariepy et al. |
| 9,618,931 B2 | 4/2017 | Zini et al. |
| 9,619,617 B2 | 4/2017 | Skirble et al. |
| 9,637,318 B2 | 5/2017 | Messina |
| 9,663,025 B2 | 5/2017 | Drexler et al. |
| 9,679,270 B2 | 6/2017 | Zini et al. |
| 9,713,302 B2 * | 7/2017 | Sandin .................... B60L 53/14 |
| 9,744,667 B1 | 8/2017 | Ferguson |
| 9,804,594 B2 | 10/2017 | Gariepy et al. |
| 9,827,668 B2 | 11/2017 | King et al. |
| 9,827,669 B2 | 11/2017 | Ferguson et al. |
| 9,891,630 B2 | 2/2018 | Gariepy et al. |
| D812,663 S | 3/2018 | Waters et al. |
| 9,927,814 B2 | 3/2018 | Wise et al. |
| 9,943,963 B2 | 4/2018 | Wise |
| 9,956,688 B2 | 5/2018 | Ferguson et al. |
| 9,963,155 B2 | 5/2018 | Gariepy et al. |
| 9,964,955 B2 | 5/2018 | Keivan et al. |
| 10,011,434 B1 | 7/2018 | Messina |
| 10,175,696 B2 * | 1/2019 | Aldred .................... B25J 9/0003 |
| 10,300,804 B2 * | 5/2019 | Salasoo .................... B60L 53/80 |
| 11,172,607 B2 * | 11/2021 | Hahn ...................... A01D 34/74 |
| 11,503,974 B2 * | 11/2022 | Han ......................... A47L 9/2826 |
| 2003/0040979 A1 | 2/2003 | Borroni-Bird et al. |
| 2003/0176986 A1 | 9/2003 | Dietsch et al. |
| 2004/0012362 A1 * | 1/2004 | Tsurumi ................ G05D 1/0234 318/568.12 |
| 2004/0158357 A1 * | 8/2004 | Lee ........................ G05D 1/0225 700/258 |
| 2004/0201361 A1 * | 10/2004 | Koh ........................ H02J 7/0042 320/104 |
| 2005/0029029 A1 | 2/2005 | Thorne |
| 2005/0114774 A1 | 5/2005 | Berryman |
| 2005/0156562 A1 * | 7/2005 | Cohen .................... H02J 7/0026 320/107 |
| 2006/0120601 A1 | 6/2006 | Dietsch et al. |
| 2007/0051546 A1 | 3/2007 | Thorne |
| 2007/0112461 A1 | 5/2007 | Zini et al. |
| 2007/0129849 A1 | 6/2007 | Zini et al. |
| 2008/0009965 A1 | 1/2008 | Bruemmer et al. |
| 2008/0040681 A1 | 2/2008 | Synstelien et al. |
| 2009/0024482 A1 | 1/2009 | Synstelien et al. |
| 2009/0030569 A1 | 1/2009 | Thorne |
| 2009/0144630 A1 | 6/2009 | Berryman et al. |
| 2009/0144631 A1 | 6/2009 | Berryman et al. |
| 2010/0026239 A1 * | 2/2010 | Li ........................... H02J 7/0044 320/109 |
| 2010/0234990 A1 | 9/2010 | Zini et al. |
| 2010/0234991 A1 | 9/2010 | Zini et al. |
| 2010/0234995 A1 | 9/2010 | Zini et al. |
| 2011/0037565 A1 | 2/2011 | Skirble et al. |
| 2011/0137457 A1 | 6/2011 | Zini et al. |
| 2011/0137759 A1 | 6/2011 | Wellington et al. |
| 2011/0163160 A1 | 7/2011 | Zini et al. |
| 2011/0208745 A1 | 8/2011 | Dietsch et al. |
| 2011/0224845 A1 | 9/2011 | Perry et al. |
| 2011/0288695 A1 | 11/2011 | Gariepy et al. |
| 2012/0019201 A1 * | 1/2012 | Peterson ................ A61N 1/3787 320/108 |
| 2012/0323365 A1 * | 12/2012 | Taylor ................... G05D 1/0242 901/1 |
| 2013/0084775 A1 | 4/2013 | Mimlitch, I et al. |
| 2013/0085625 A1 | 4/2013 | Wolfe et al. |
| 2013/0245857 A1 | 9/2013 | Gariepy et al. |
| 2014/0074287 A1 | 3/2014 | LaFary et al. |
| 2014/0330428 A1 | 11/2014 | Wolfe et al. |
| 2014/0350725 A1 | 11/2014 | LaFary et al. |
| 2014/0365258 A1 | 12/2014 | Vestal et al. |
| 2015/0039157 A1 | 2/2015 | Wolfe et al. |
| 2015/0045945 A1 | 2/2015 | Zini et al. |
| 2015/0227885 A1 | 8/2015 | Zini et al. |
| 2015/0234386 A1 | 8/2015 | Zini et al. |
| 2015/0323699 A1 | 11/2015 | Gariepy et al. |
| 2016/0031086 A1 | 2/2016 | Tanabe et al. |
| 2016/0110684 A1 | 4/2016 | Wellington et al. |
| 2016/0124434 A1 | 5/2016 | Gariepy et al. |
| 2016/0129917 A1 | 5/2016 | Gariepy et al. |
| 2016/0349749 A1 | 12/2016 | Gariepy et al. |

(56) References Cited

U.S. PATENT DOCUMENTS

| | | |
|---|---|---|
| 2016/0349754 A1 | 12/2016 | Mohr et al. |
| 2016/0364686 A1 | 12/2016 | Wolfe et al. |
| 2017/0038776 A1 | 2/2017 | Gariepy et al. |
| 2017/0072558 A1 | 3/2017 | Reynolds et al. |
| 2017/0080846 A1 | 3/2017 | Lord et al. |
| 2017/0080850 A1 | 3/2017 | Drexler et al. |
| 2017/0120454 A1 | 5/2017 | Ferguson et al. |
| 2017/0183169 A1 | 6/2017 | Wolfe et al. |
| 2017/0197643 A1 | 7/2017 | Gariepy et al. |
| 2017/0205833 A1 | 7/2017 | Gariepy et al. |
| 2017/0232885 A1 | 8/2017 | Drexler et al. |
| 2017/0233231 A1 | 8/2017 | Gariepy et al. |
| 2017/0252926 A1 | 9/2017 | Wise et al. |
| 2017/0253136 A1 | 9/2017 | Lord et al. |
| 2017/0276501 A1 | 9/2017 | Wise et al. |
| 2017/0291303 A1 | 10/2017 | Ferguson et al. |
| 2017/0291315 A1 | 10/2017 | Wise |
| 2017/0294784 A1 | 10/2017 | King et al. |
| 2017/0297197 A1 | 10/2017 | King et al. |
| 2017/0305011 A1 | 10/2017 | Ferguson et al. |
| 2018/0004200 A1 | 1/2018 | Gariepy et al. |
| 2018/0039276 A1 | 2/2018 | Keivan et al. |
| 2018/0081373 A1 | 3/2018 | Gariepy et al. |
| 2018/0169857 A1 | 6/2018 | Henning et al. |
| 2018/0169866 A1 | 6/2018 | Wise |
| 2019/0379212 A1* | 12/2019 | Cho ................ G06N 3/088 |

FOREIGN PATENT DOCUMENTS

| | | | |
|---|---|---|---|
| JP | H09191334 A | * | 7/1997 |
| JP | 2007160408 | * | 9/2005 |
| JP | 2006231448 A | * | 9/2006 |
| JP | 2007160408 A | * | 6/2007 |
| JP | 2013059196 A | * | 9/2011 |
| JP | 2013059196 A | * | 3/2013 |
| WO | 2007047510 A2 | | 4/2007 |
| WO | 2007047514 A2 | | 4/2007 |
| WO | 2015017231 A1 | | 2/2015 |
| WO | 2015069560 A1 | | 5/2015 |
| WO | 2018039337 A1 | | 3/2018 |

OTHER PUBLICATIONS

International Search Report and Written Opinion in International Patent Application No. PCT/US2017/048201 dated Dec. 7, 2017, 9 pages.
Fetch Robotics, "Cart Connect," 2018, 10 pages.
Fetch Robotics, "Fetch Robotics Announces CartConnect and RollerTop Robots," Apr. 5, 2018, 9, pages.
Fetch Robotics, "RollerTop," 2018, 9 pages.
Reynolds, "Adept Technology's Autonomous Mobile Robotic Conveyor," May 1, 2013, 4 pages.

* cited by examiner

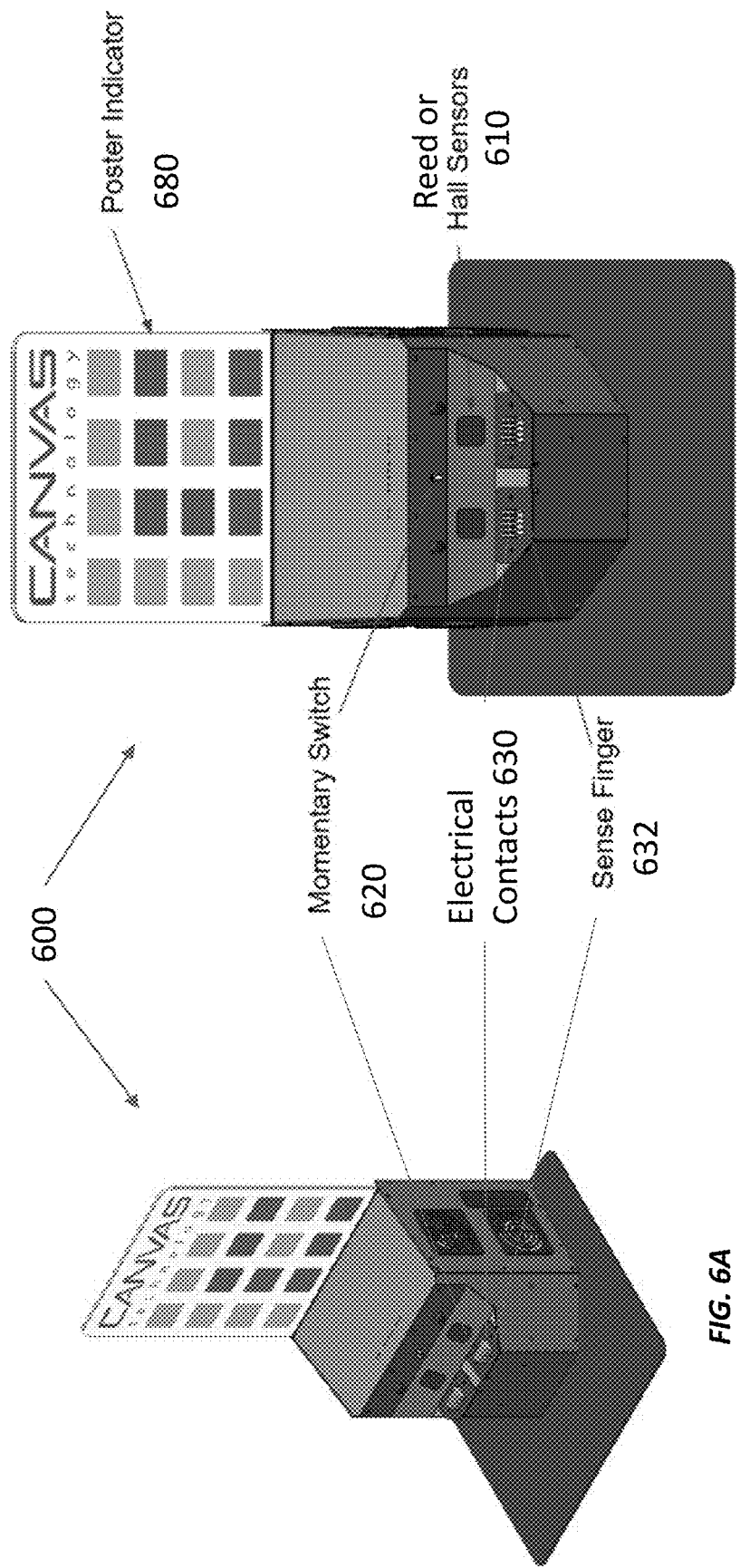

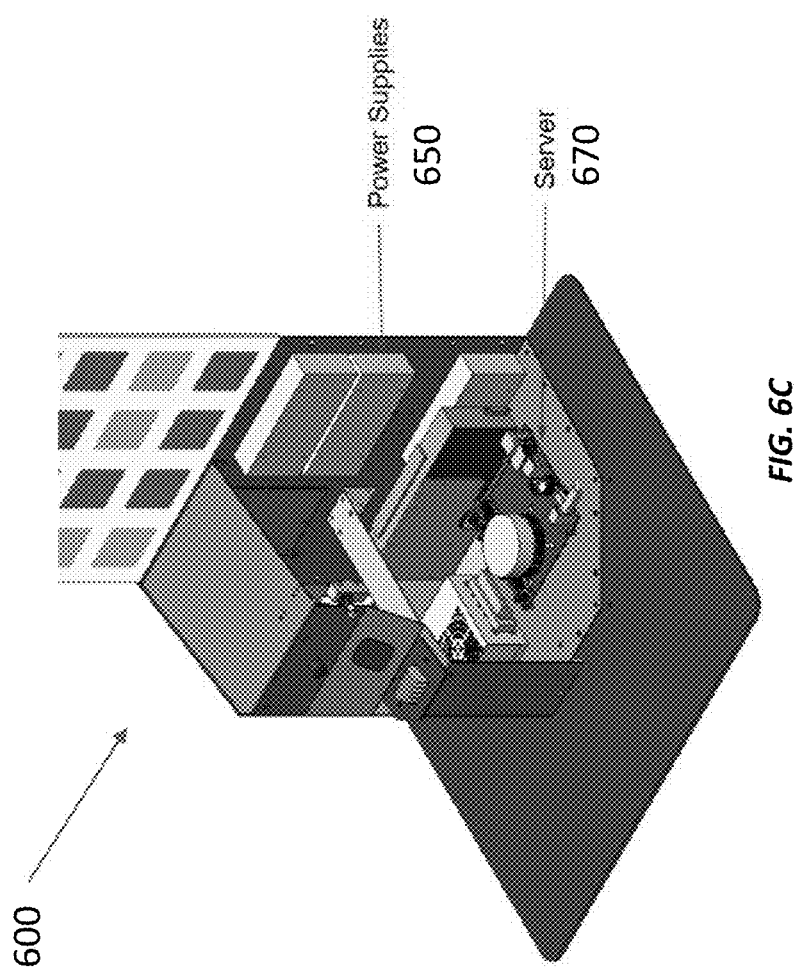

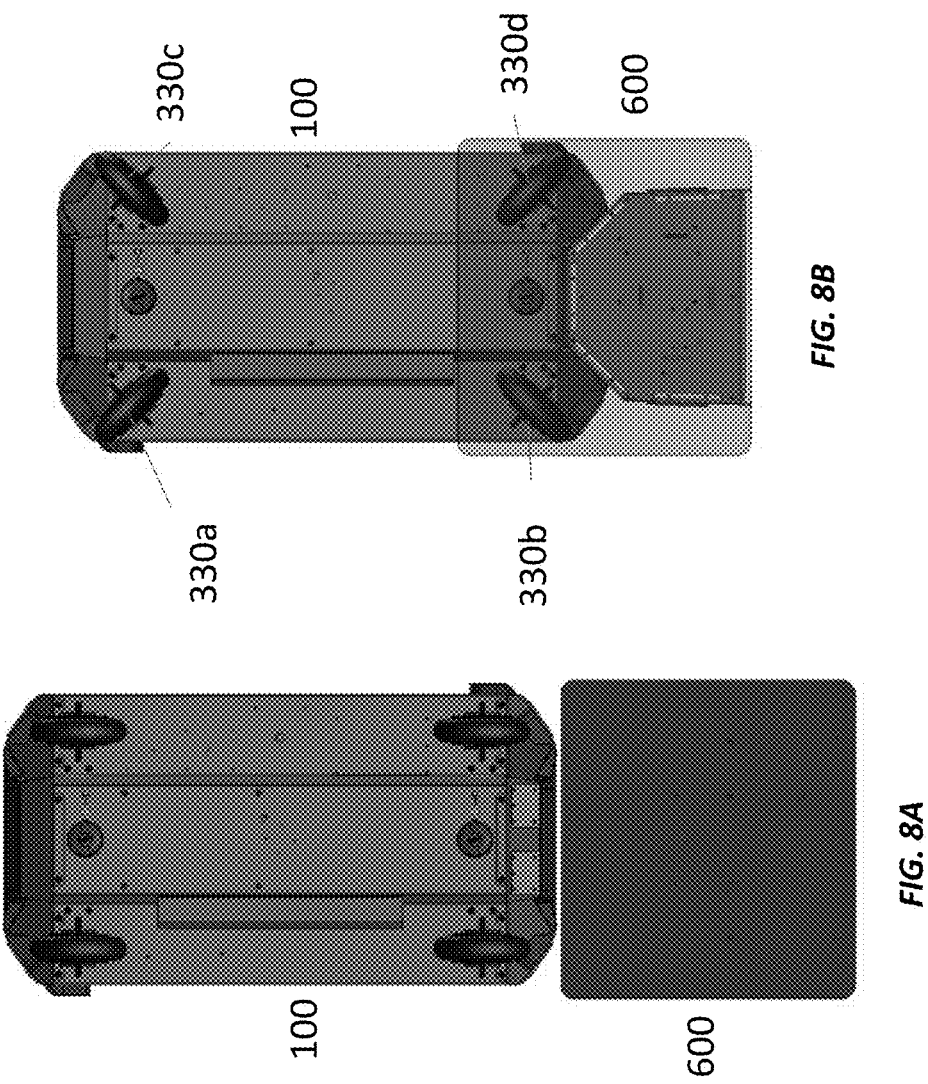

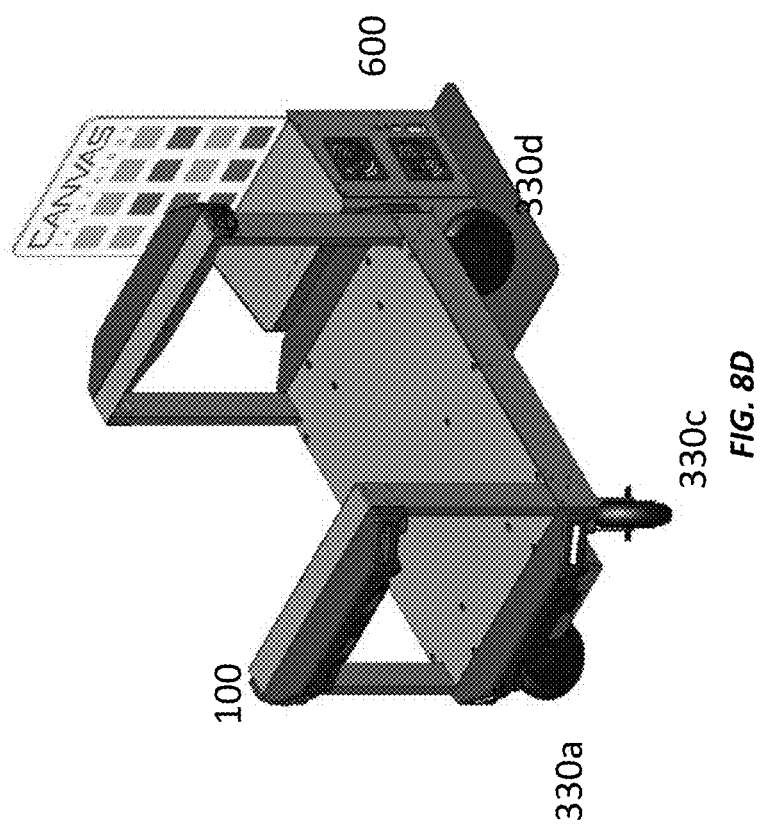

CHARGING SYSTEMS AND METHODS FOR AUTONOMOUS CARTS

CROSS-REFERENCE TO RELATED APPLICATION(S)

This application claims the priority benefit, under 35 U.S.C. § 119(e), of U.S. Application No. 62/525,338, entitled "CHARGING SYSTEMS AND METHODS FOR AUTONOMOUS ROBOT," which was filed on Jun. 27, 2017, and is incorporated herein by reference in its entirety.

BACKGROUND

An autonomous robot, also called a robot, an autonomous cart, or simply a cart, can move products and materials in a warehouse or other industrial environment. The autonomous robot can navigate autonomously indoors or outdoors in dynamic environments where things change frequently. The autonomous robot uses state-of-the-art "dense" visual perception giving it unequalled and continuous awareness of its surroundings. With this it can operate at a cost, speed, level of safety and efficiency that has never been possible before. An autonomous robot can make factories and warehouses more efficient and safer. It enables the movement of smaller batches of material more frequently, reduces the need for expensive conveyor systems, and supplants eliminate dangerous fork trucks from indoor environments.

SUMMARY

Embodiments of the present technology include chargers for autonomous robots. An example charger includes a power supply, a sensor operably coupled to power supply, and a charging element in electrical communication with the power supply. In operation, the sensor senses a position of the autonomous robot with respect to the charger. And the charging element charges the autonomous robot with power from the power supply in response to a signal from the sensor indicating that the autonomous robot is positioned to be charged by the charger.

The sensor may include a magnetic sensor, such as a passive Reed switch or an active Hall effect sensor, that senses a magnet in or on the autonomous robot. It can also include a momentary switch, disposed on a side of the charger facing the autonomous robot, to complete a circuit between the power supply and the charging element in response to actuation by the autonomous robot.

The charger may also include a voltage sensing element, in electrical communication with the power supply, to measure a voltage at an electrical contact of the autonomous robot. This voltage can be used to determine the resistance of electrical connection between the autonomous robot and the charging element. If the resistance is too high, the cart or charger may issue an alert indicating that the electrical contact, charging element, or both are corrupted or degraded.

The charger can stop charging the autonomous robot in response to a fault signal from the sensor. This fault sensor can indicate that the autonomous robot is not positioned to be charged by the charger (e.g., the cart and the charger may be too far apart).

The charger may comprise a processor in electrical communication with the charging element. In operation, the processor can modulate a current supplied to the autonomous robot via the charging element. For example, the processor may modulate the current based on a charging cycle of the charger.

The charger may include a visual target, on or in proximity to the charger, to guide the autonomous robot to the charger. The autonomous robot's visual navigation system may sense and identify this visual target, then steer the autonomous robot to the charger.

A resilient member, such as a foam pad, may support the charging element. In operation, the resilient member can push the charging element against an electrical contact of the autonomous robot.

Another embodiment includes a method of charging an autonomous robot with a charger. This method comprises sensing that a state-of-charge of a battery of the autonomous robot is within a predetermined range (e.g., below a predetermined threshold or with a certain percentage of a predetermined threshold). If the state-of-charge is within this range, the autonomous robot is guided to within visual range of the charger. The autonomous robot acquires an image of a target on or in proximity to the charger and is then guided to the charger based on the image of the target. A sensor, such as a magnetic sensor in the charger, sensing that the autonomous robot is positioned to be charged by the charger. In response to sensing that the autonomous robot is positioned to be charged by the charger, the charger supplies a current to the autonomous robot. The charger also modulates the current to transmit information from the charger to the autonomous robot.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 6A shows a perspective view of a charging station for an autonomous cart.

FIG. 6B shows another perspective view of the charging station of FIG. 6A.

FIG. 6C shows a cutaway view of the charging station of FIG. 6A.

FIG. 8A shows a bottom view of an autonomous cart pulling up to a charging station.

FIG. 8B shows a bottom view of an autonomous cart parked in front of a charging station in charging position.

FIG. 8D shows a perspective view of an autonomous cart parked in front of a charging station in charging position.

DETAILED DESCRIPTION

Figure 1A:
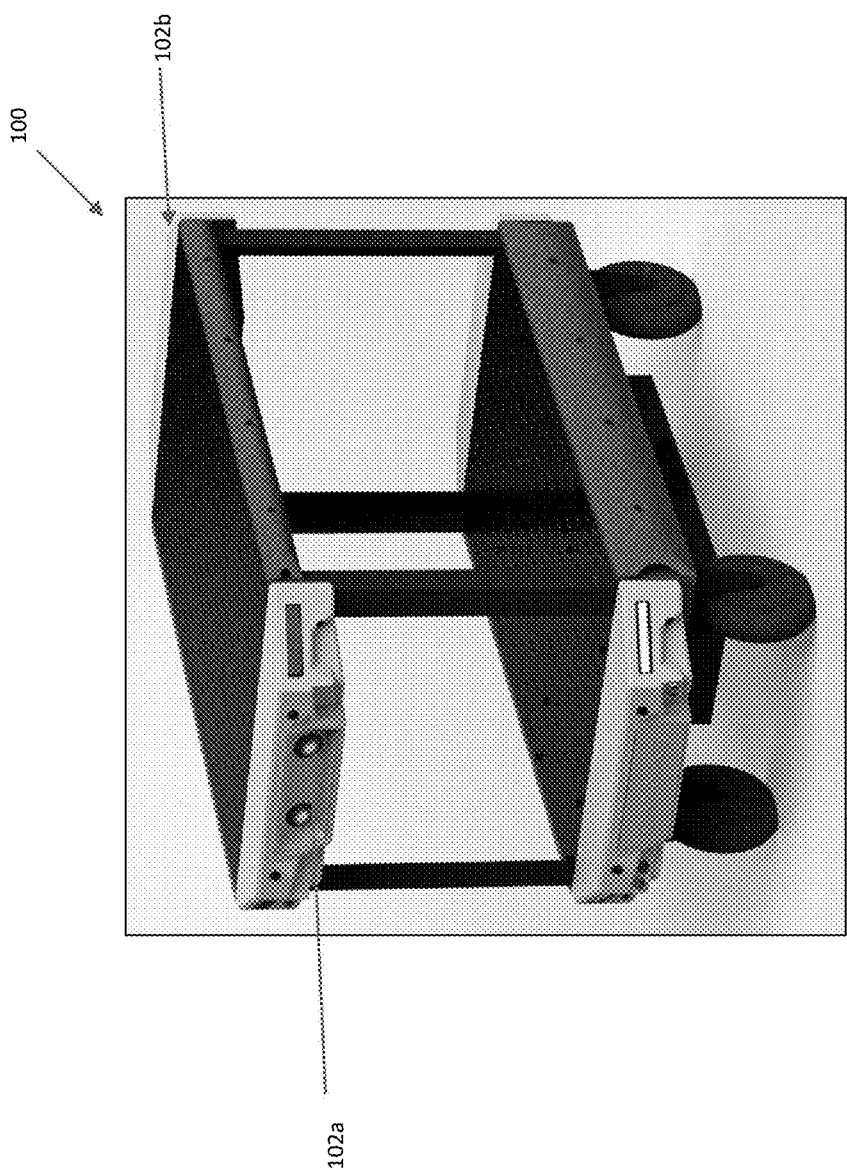
FIG. 1A shows an autonomous cart for moving products or materials in a warehouse or other industrial environment.

The autonomous robot automatically recharges its on-board batteries when needed with a charging station, or charger, that can be located in a corner of the warehouse or industrial environment. A large warehouse or a warehouse with many carts may have several chargers, either centrally located or scattered in corners or located near intersections for convenient charging. The number of chargers and their locations may depend on the duty cycle(s) of the robot(s) selected by the end-user and the locations available for the chargers. For example, if a charger can be collocated with a normal stopping point for the robot such that the robot can charge while working at a waypoint, then one charger may serve many robots.

The autonomous robot stores a map of its environment that indicates where these chargers are located. When the autonomous robot senses that its battery's state of charge or depth of discharge has reached a predefined threshold, the autonomous robot may move to the nearest available charger, then dock with the charger using its on-board visual navigation system. The exact state of charge threshold for re-charging is configurable and can be set based on the use case. If the robot has a long way to go to a charger, the threshold may be set to a more conservative figure, such as 30%. If the robot will always (or almost always) be within short range of a charger, the threshold may be set lower, e.g., to about 10%. Once the autonomous robot has recharged its battery, it resumes moving materials around the warehouse.

More specifically, the autonomous robot's on-board computer runs a software stack with a target tracker sub-module (also referred to as "target tracker software") that enables the autonomous robot to navigate autonomously throughout its environment. The target tracker software includes a library of code that can be implemented in multiple applications and/or scenarios that benefit from target tracking. In operation, the target tracker sub-module can track "target" images based on image-sensor outputs. The target tracker software can also be trained to identify a charger based on the size and shape of the charger or an image or other identifying feature, called a "target," that is attached to or near the charger. That target can be changed. For example, the target could be a customer logo, a charger logo, or any other recognizable image on or near the charger.

When charging is needed or desired, the autonomous robot automatically identifies an unoccupied charger, drives near the charger, then 'locks onto' and tracks the target as it moves closer to and eventually engages the charger. In order to 'lock onto' the target, the robot searches image outputs from one or more of its image sensors. The robot generates an estimate of the target's relative position based on dense visual perception. The robot performs this process continuously as it moves toward the charger, tracking the target as it moves until it eventually arrives at its goal location relative to the target image; that is, until the robot is engaged with the charger.

(The charger does not have to be in a fixed place. If the charger were to be moved to within a few meters of its previous location, the autonomous robot could search the area for the target and locate the charger near the target. Based on the target alone, the charger could move 0.5 meters to 1.0 meter and shift in angle when observed from a given waypoint by up to about 30 degrees.)

The robot engages the charger by forming an electrical connection with the charger's electrical contacts. This electrical connection is supported by a mechanical connection with a large amount of compliance ensures a good electrical connection even if the charger and robot don't align well. For example, if the charger is sitting on a floor that is not perfectly flat, or if dirt or debris builds up in front of the charger, the robot may not be perfectly aligned as it approaches and connects with the charger. Compliant foam, springs, and other materials ensure that the charger's connection to the cart is electrically and mechanically sound.

The charger has several built-in safety features to ensure safe charging. It may include a sensing contact, such as the sense finger described below, to monitor the status of the charging process. This sensing contact may measure whether the cart is charging and the amount of current flowing. It may do this by continuously monitors the output current and voltage to make sure charging remains within a safe operating window. If at any point the outgoing current does not return to charger, the sense finger detects a fault condition and shuts down the charger. Outgoing charger current failing to return to the charger can indicate that the current path has been interrupted. Similarly, if the sense finger detects an unknown resistance (e.g., a short or open circuit) on the charger output during charging, the charger will indicate a fault condition and charging will stop.

The charging system may include other safety mechanism, such as momentary switches or contactless Hall sensors, to measure the cart's proximity to the charging system. The Hall sensors detect small magnets in or on the cart, and the momentary switch indicates the distance between the cart's bumper and the charger. For the charger to operate, the sense finger should detect a stable connection to the cart, the Hall sensors should detect the presence of the cart, and the momentary switch should be depressed indicating a correctly docked autonomous cart.

An Autonomous Cart and its Components

FIGS. 1A-1D show different views of an example autonomous cart 100 suitable for use in warehouses, manufacturing facilities, and outdoor settings. The autonomous cart includes forward-looking 102a and backward looking 102b binocular vision sensor units (collectively, binocular vision sensor units 102), each of which includes two laterally displaced image sensors and accompanying hardware; four drive train units 104a-104d (collectively, drive train units 104), each of which is mounted under a different corner of the chassis; and an underbelly 106 containing a rechargeable power supply, such as a battery, and additional electronics. The autonomous cart 100 can also include a two-dimensional LIDAR sensor (not shown) to sense and identify objects or people approaching the cart outside the binocular vision sensor units' field of view (e.g., from the side). The autonomous cart may also include other sensors and electronics, including side-looking image or acoustic sensors as well as an antenna for communicating with a wireless communication network using a suitable wireless communication protocol (e.g., IEEE 802.11 protocols).

Figure 1B:
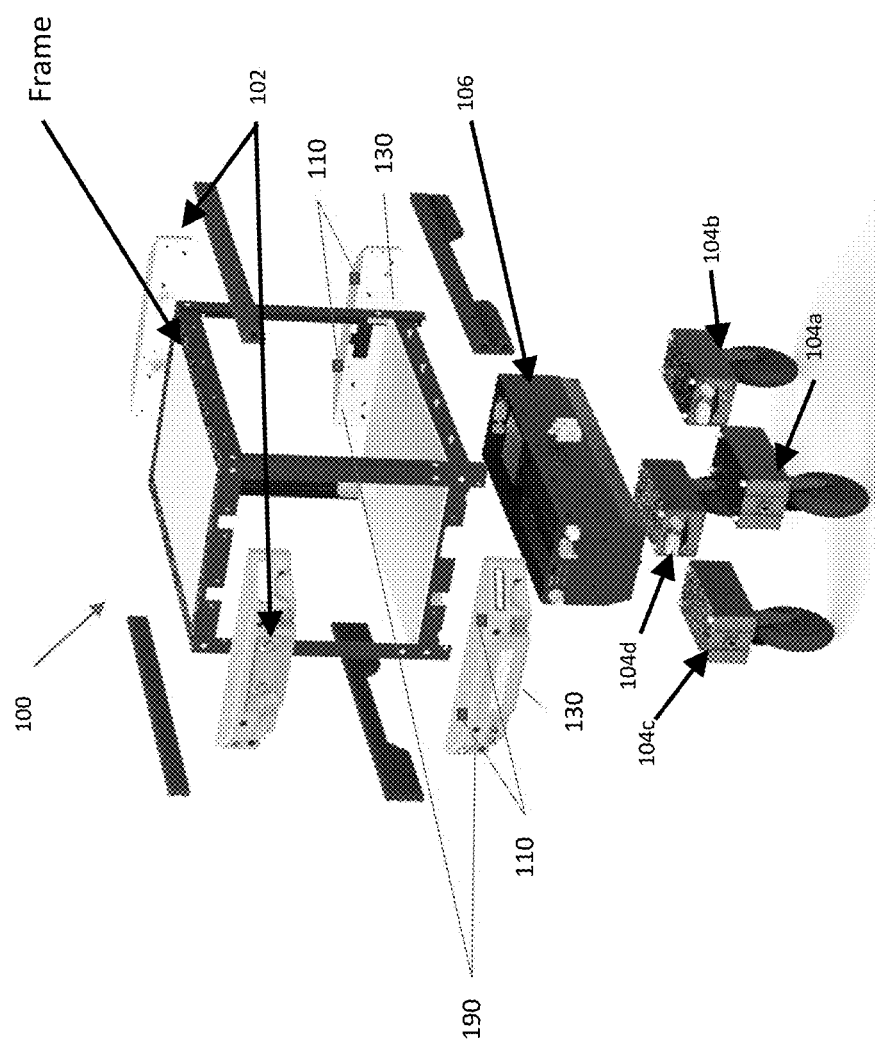
FIG. 1B shows an exploded perspective view of the autonomous cart of FIG. 1A.
Figure 1C:
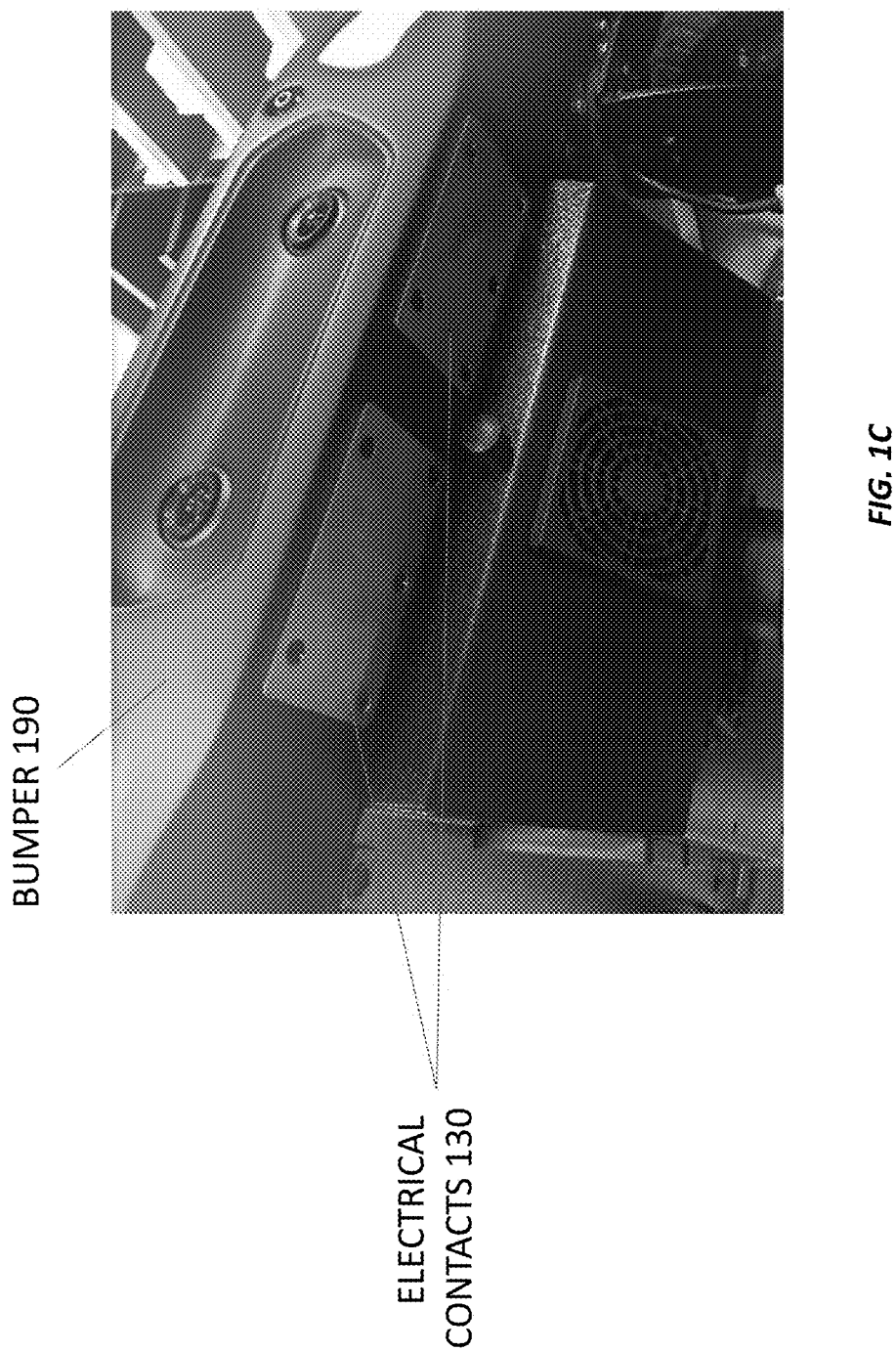
FIG. 1C is a photograph showing the contact plates on the underside of the rear bumper of an autonomous cart.
Figure 1D:
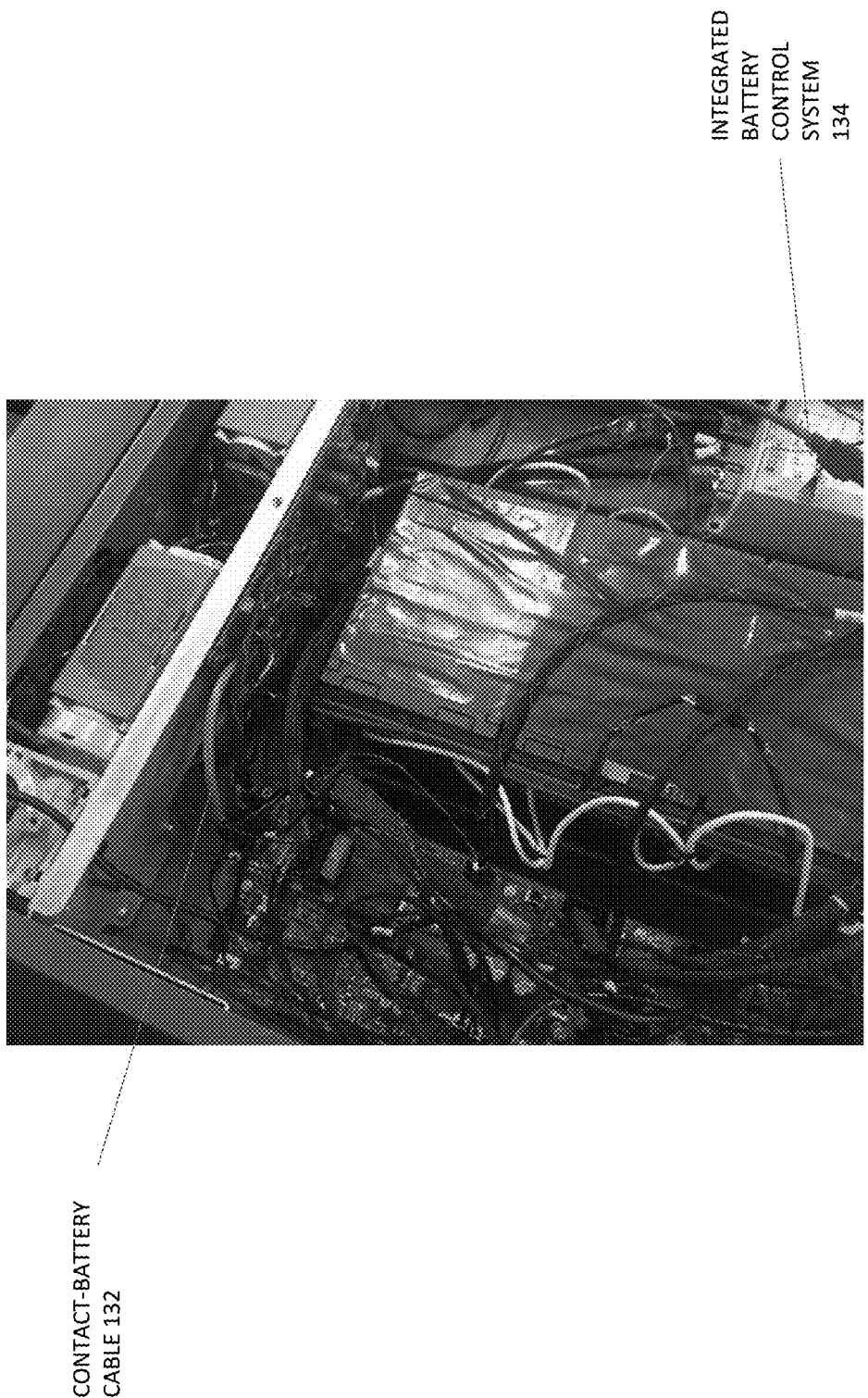
FIG. 1D is a photograph showing internal electrical connections to the contact plates of FIG. 1C.

The autonomous cart 100 also has front and rear lower bumpers 190 that are shaped to mate with the charging station, as described in greater detail below. Either or both lower bumpers 190 may have one or more electrical contacts 130 that contact the charging station's electrical contacts for current to flow from the charging station to the cart's power supply. For example, FIG. 1C is a photograph of a rear bumper 190 with a set of contact plates 130 that mate with corresponding electrical contacts on the charger. These contact plates 130 are connected to the autonomous cart's power supply via cabling 132, a circuit board (not shown), and an integrated battery control system (IBCS) 134 as shown in FIG. 1D. The IBCS 134 performs power control and battery management functions for the autonomous cart's power supply. It eliminates the need for external current sensors as well as for external relays or contactors for cutoffs. The IBCS 134 can measure battery current, calculate state of charge, and protect the power supply from faults.

In addition, the lower bumpers 190 may be shaped and sized to trip an optional momentary switch that controls charging by the charging station. Similarly, magnets 110 in, on, or under the lower bumpers 190 may trip magnetic switches, such as passive Reed switches or active Hall effect switches, that control charging by the charging station.

Figure 2:
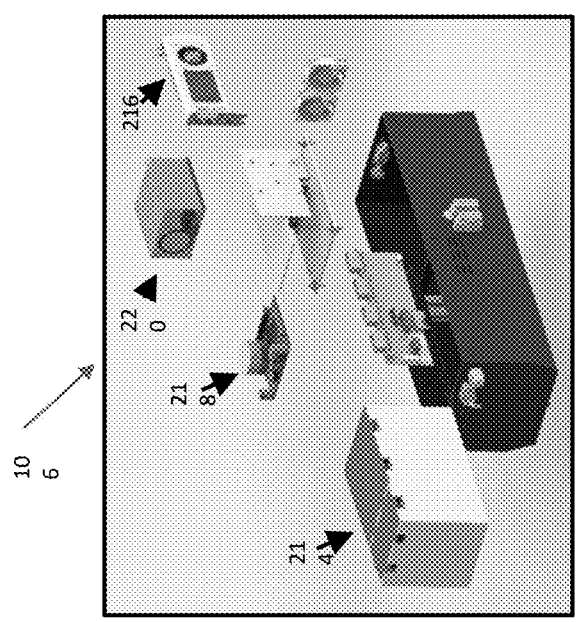
FIG. 2 shows an exploded view of an autonomous cart's control system.

FIG. 2 shows an exploded view of the underbelly 206, which includes several processors and a rechargeable power supply 214 for powering the autonomous cart's electronics and drive train units 104. The processors include a graphics processor unit (GPU) 216 and central processor unit (CPU) 218 for processing information from the cart's sensors, from other carts, and from servers or other devices that communicate with the cart via the antenna. The underbelly also contains a position sensor unit (PSU) 220, such as an Inertial Measurement Unit (IMU), that measures acceleration (including the constant acceleration of gravity, which indicates whether the cart is going up or down) and the rate of change of orientation.

Figure 3:
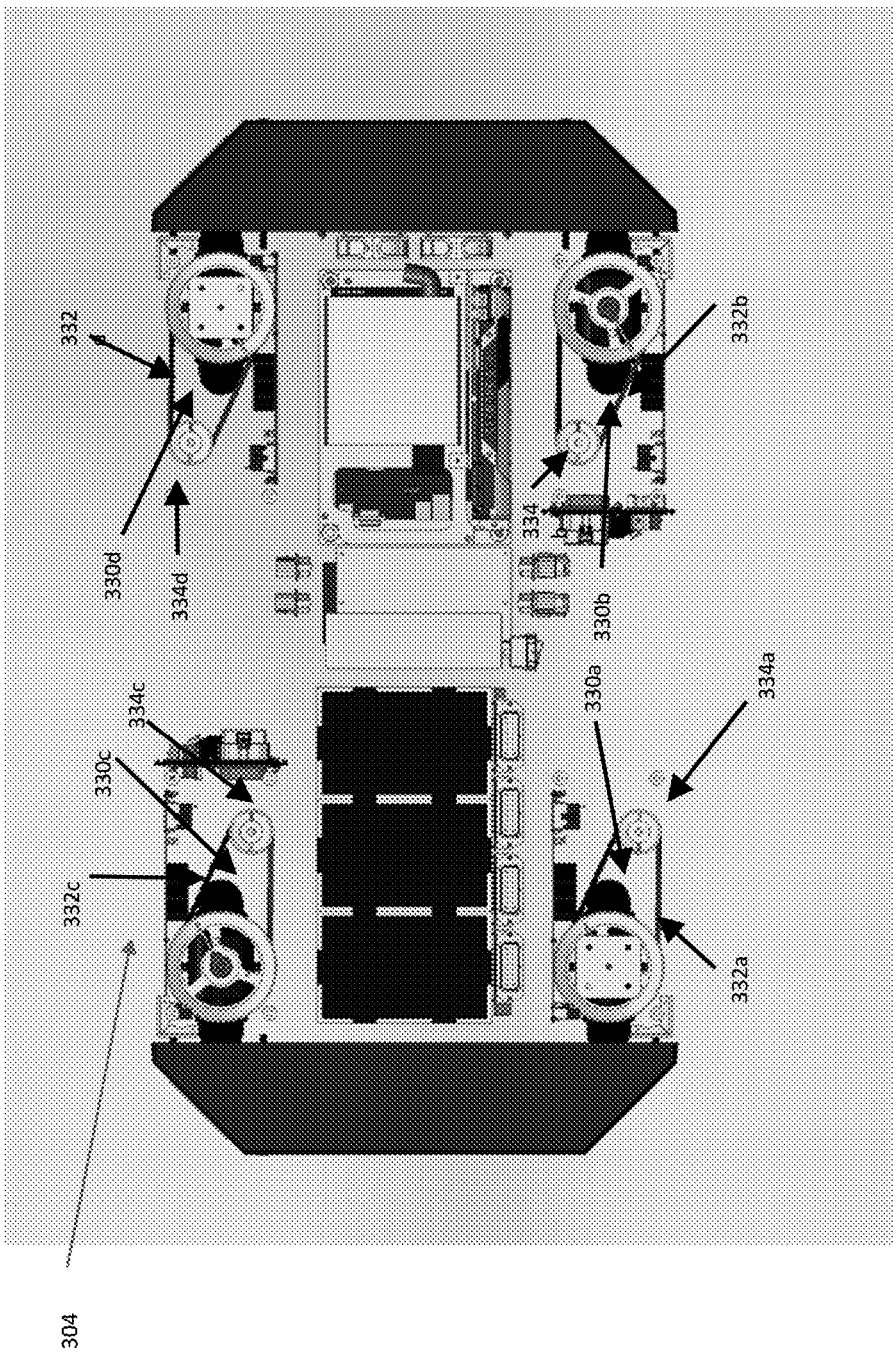
FIG. 3 shows a plan view of a complete drivetrain for an autonomous cart.

FIG. 3 shows the cart's drive system 304, which includes four wheel assemblies with wheels 330a-330d (collectively, wheels 330), steering pulleys 332a-332d (collectively, steering pulleys 332), and motors 334a-334d (collectively, motors 334). The drive system 304 is a swerve drive with vertical steering axes. It can be more difficult to control but provides more maneuverability than drive systems with tilted steering axes or skid-steering. The swerve drive uses off-the-shelf wheel motors to drive and off-the-shelf steering motors to turn. The rest of the design is custom and provides strength, reliability, simplicity of maintenance and assembly, and control.

Figure 4:
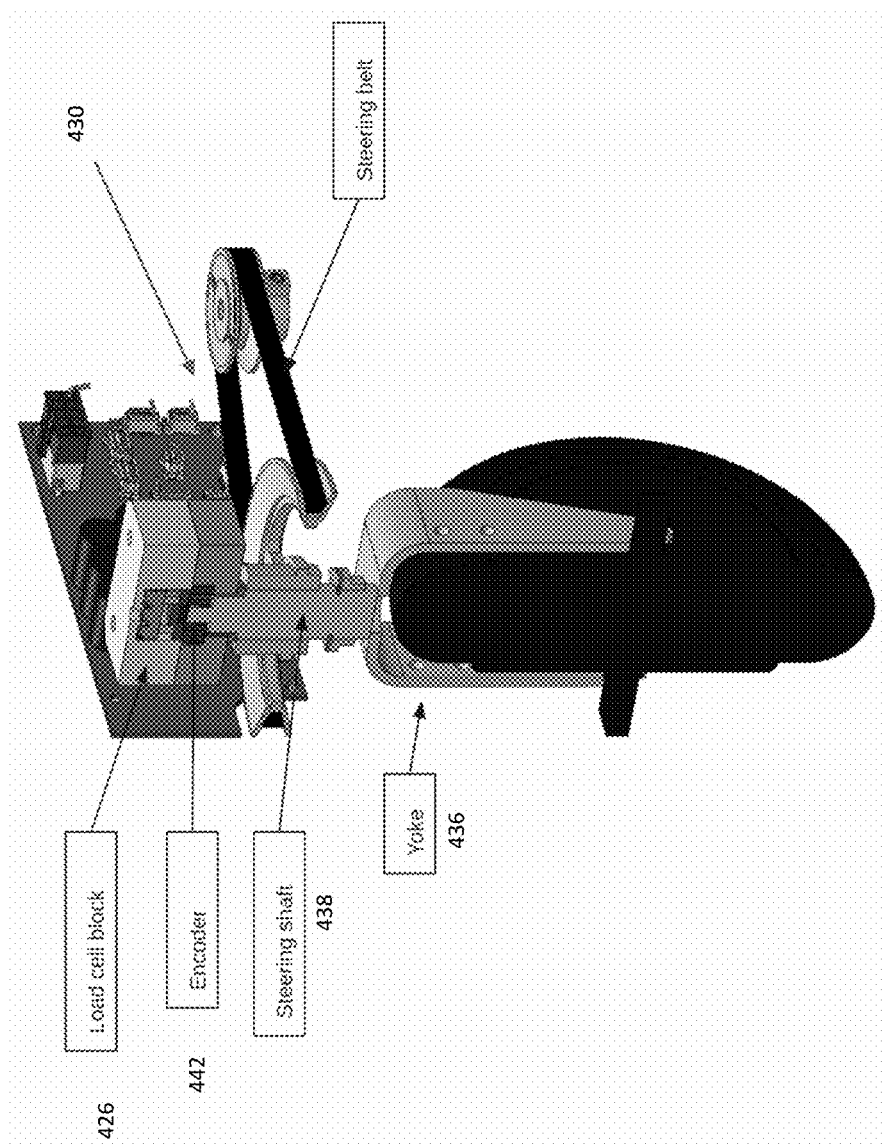
FIG. 4 shows an exploded view of a drive train unit

FIG. 4 shows a wheel assembly 430. Each wheel is held in place by a yoke 436, which is attached directly to a vertical steering shaft 438. The vertical steering shaft 438 defines the steering axis for the wheel assembly. The vertical steering shaft 438 is held in place by an upper bearing and lower bearing, which allow the shaft 438 to rotate and move vertically. The vertical movement allows the vertical steering shaft 438 to push against a load cell 426 that measures the amount for force exerted on the autonomous cart 100. The shaft 438 also turns an encoder 442 that provides rotational measurements to enable steering control.

Figure 5:
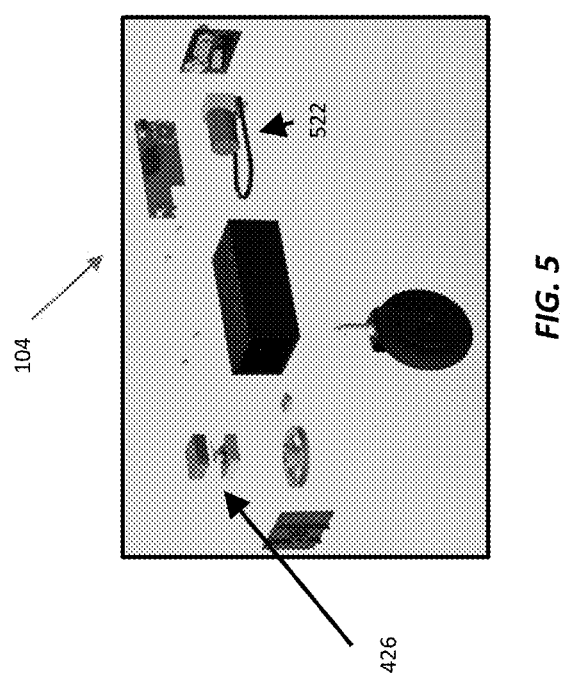
FIG. 5 shows a cutaway view of a wheel assembly for an autonomous cart.
Figure 6D:
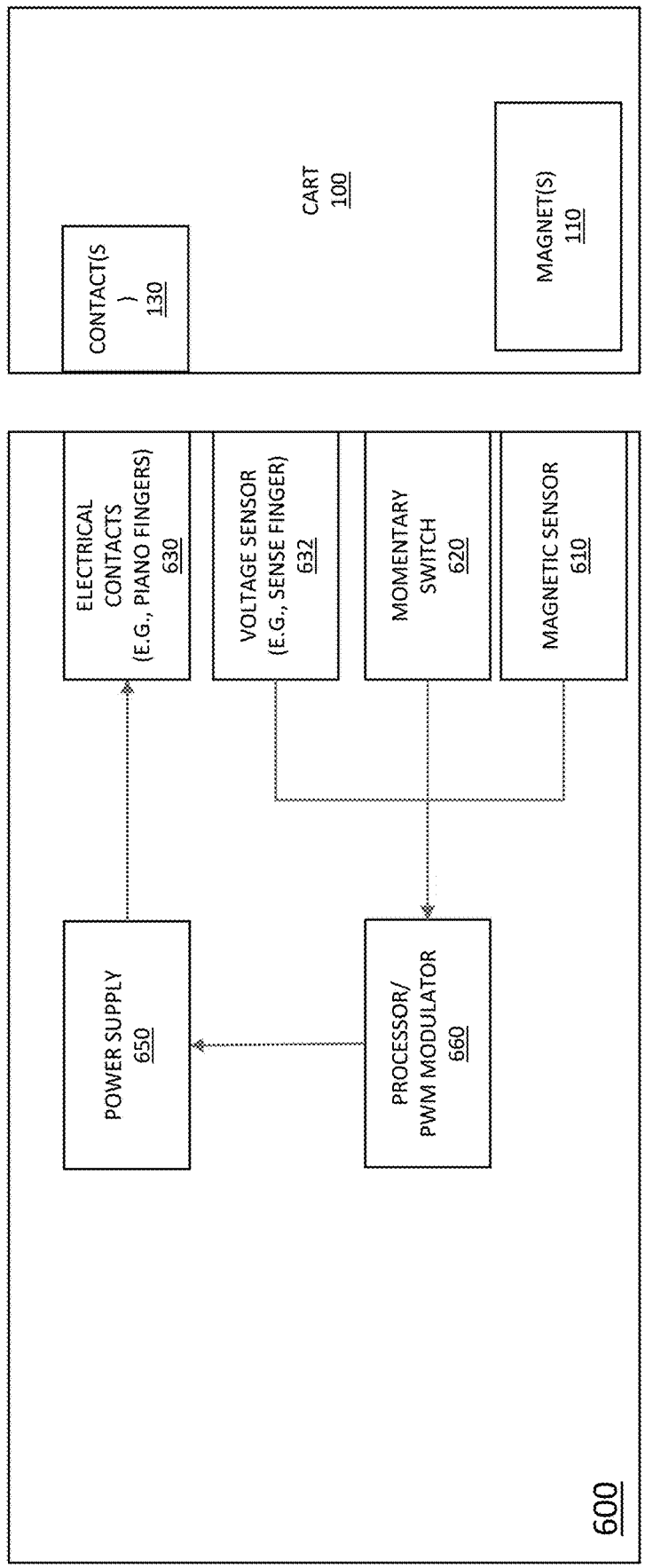
FIG. 6D shows a block diagram of the charging station of FIG. 6A.
Figure 6E:
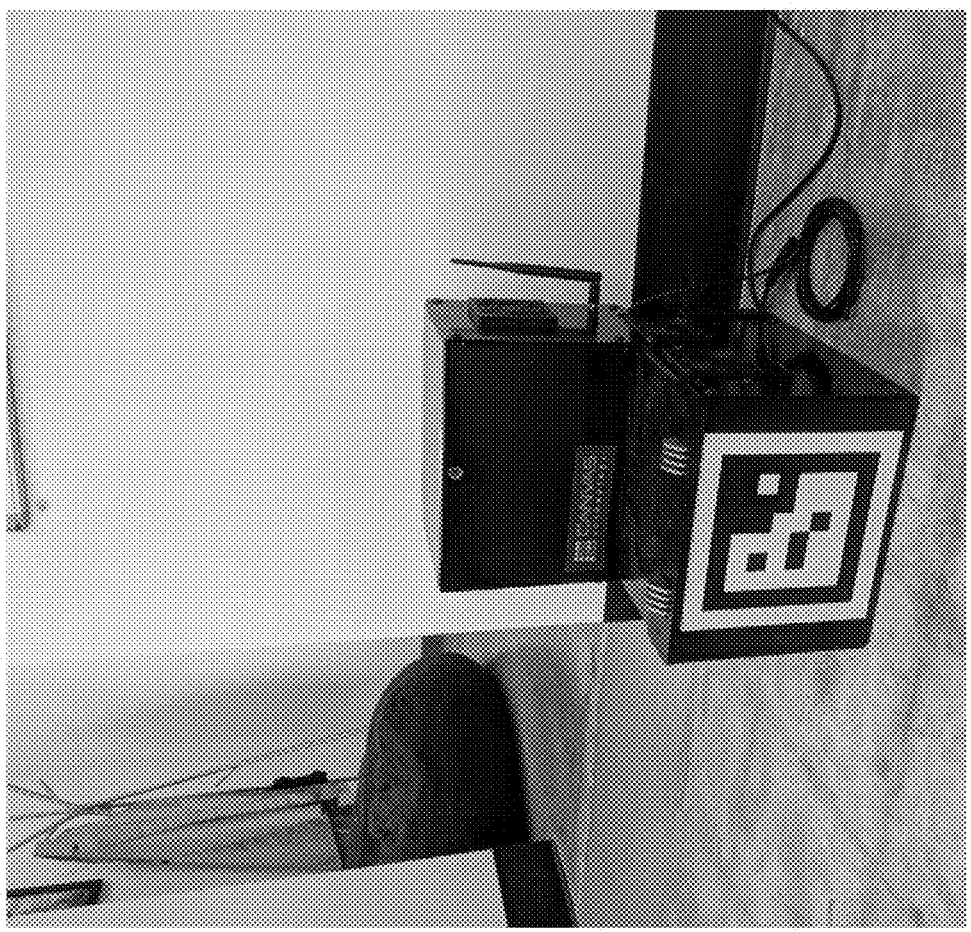
FIG. 6E is a photograph of an example charging station.

FIG. 5 shows an exploded view of a drive train unit 104. The drive train unit includes a steer motor 522 that turns a wheel mounted on a vertical axis. It also includes an encoder block that can measure the number of rotations of an axis coupled to the steer motor in order to provide an indication of how far the cart has moved and how fast it is moving or has moved. The load cell 426, which is mounted in or on the drive train unit 104, measures force exerted on the cart. The load cell 426 can be located next to the encoder within a single block of aluminum, on the opposite side of the steering motor, on the output shaft, or in any other suitable position. The drive train unit 104 may include or be coupled to a brake (not shown) to slow the cart or keep it from moving.

The autonomous cart's drive train enables holonomic motion: the number of degrees of freedom equals the number of controllable degrees of freedom. Put differently, each of the autonomous cart's wheels can move—and be controlled to move—independently about its vertical steering axis and about its (horizontal) axle. As a result, the autonomous cart can steer front-only (like a car), rear-only, all-wheel, or crab. All-wheel-steer enables the robot to spin in place. Crab-steer enables it to move sideways. The ability to move in all of these ways enables better trajectory planning, allowing smooth motion even when compensating for any potential short-term flaws in perception or localization. It also enables the cart to move sideways, moving into positions where a front-only or skid-steer device would have to do a more complicated 3-point turn or parallel parking maneuver. The autonomous cart uses this flexible steering to align itself properly with a charging station for charging its internal power supply as described in greater detail below.

In addition, the autonomous cart can use independent control of its wheels for stopping and staying stopped, eliminating the need for a separate brake. To slow down, the cart's drive train units may turn one or more of the wheels slightly inward, much like snowplowing when skiing, to slow or stop the cart or to keep it stopped. Turning the wheels slightly inward is relatively easy to control and very effective, even on an incline.

The wheels may also be turned inward or outward to keep the autonomous cart from moving after it has already reached a stop. To see how, imagine that the autonomous cart's wheels are oriented parallel to each other. If the wheels on the front of the cart are each rotated inward by about 45° and the wheels on the back of the cart are each rotated outward by about 45° or vice versa, the cart won't be able to move. In other words, turning each wheel so that it is not parallel with its two neighboring wheels locks the autonomous cart in position. Thus, the autonomous cart's holonomic steering provides an effective, elegant alternative to a conventional parking brake.

For more information on autonomous carts, including more information on load cells and path planning, see International Application No. PCT/US2017/048201, which is entitled "Autonomous Cart for Manufacturing and Warehouse Applications" and is incorporated herein by reference in its entirety.

A Charging Station for an Autonomous Cart

FIGS. 6A-6E show a charging station 600, or charger, for the autonomous cart 100 described above. The charger 600 includes a power supply 650 that provides electrical power to the cart 100 via electrical contacts 630 that touch the cart's electrical contacts 130 when the cart 100 is mated to the charger 600. This power supply 650 is controlled by a processor 660 that oversees the charging process. The processor 650 is operably coupled to one or more magnetic sensors 610 and an optional momentary switch 620 that sense the cart's proximity to the charger 600. A separate sensor 632 measures the voltage at the cart charging pad 130.

The processor 660 turns the power supply 650 off and on based on the cart's proximity as measured by the magnetic sensors 610 and the optional momentary switch 620. It determines the resistance of the electrical connection between the cart 100 and the charger 600 based on the voltage measured by the sensor 632 and the current flowing from the charger 600 to the cart 100.

And it can act as a pulse width modulator (PWM) that modulates the current flowing from the charger 600 to the cart 100 to transmit information to the cart 100. This information may include the charging profile, the current level, the charging mode (e.g., constant current or constant voltage), voltage sensed by the sensor 632, and faults, if any.

The autonomous cart 100 finds the charging station 600 by looking for the target 680, such as a poster indicator with a distinctive design, with a visual image acquisition and recognition system. This target can be a logo located above or near the charger 600, as in FIGS. 6A-6C, or a Quick Response (QR) code or similar design on the charger 600, as in FIG. 6E. The cart 100 sees this target 680, registers its location in relation to the charger 600, then navigates to its properly docked position.

For carts that use lidar for steering, the image may be replaced by a set of uniquely shaped or textured items, such as an array of retroreflectors or a surface patterned in a unique way, to distinguish the charger from its surroundings. The lidar may also be able to detect the charger itself, including its components (e.g., the charger's electrical contacts), with fine enough spatial resolution for the cart to dock itself properly to the charger.

Once the autonomous cart 100 has found the charging station 600, it steers itself close enough to the charging station 600 to engage the charging station's electrical contacts 630. Then charging begins and continues until the cart's power supply 214 has been recharged sufficiently.

The charging station 600 includes one or more physical safety measures, including one or more magnetic sensors 610 and the momentary switch 620, to ensure that the autonomous cart 600 is properly mated to the charging station 600 before charging begins. The magnetic sensors 610 are positioned on the charging station 600 to detect magnets in or on the autonomous cart 100. When the cart 100 gets close enough to the charging station 600, the magnets trip the magnetic sensors 610, causing the processor 660 to start charging the cart 100.

The optional momentary switch 620 can also control the electrical connection between the power supply 650 and the electrical contacts 630. The momentary switch 620 is on the front of the charging station 600 and is actuated by the autonomous cart's bumper: when the autonomous cart is close enough to the charging station 600 for charging to begin, the bumper "pushes in" the momentary switch 620, causing the power supply 650 to supply current to the electrical contacts 630. This ensures that the autonomous cart is fully docked on the charger 600 before charging begins.

The charger 600 begins the charging process in response to detecting that the robot 100 is fully docked on the charger and the magnetic sensors 610 and momentary switch 620 are actuated. The magnetic sensors 610 and momentary switch 620 prevent the charger from starting the charging process if the robot is not docked properly. A sense finger 632 measures the voltage at the cart charging pad 130. This voltage can be used to calculate the resistance of the connection between the charger's electrical contacts 630 and the cart's contact pads 130 by comparing to the voltage measured at the output to the charger's finger.

Electronics inside the cart 100 monitor the charging current. If the current flow changes, charging may slow or stop as described in greater detail below. Similarly, if at any point during the charging, the charger 600 detects that any of the switches (e.g., magnetic sensors 610 or momentary switch 620) is no longer actuated or that the current value is outside an acceptable range (e.g., 3 A to 30 A), it may suspend charging until it detects a safe state to restart the charging process.

Server in Charger

As described above and explained in greater detail in International Application No. PCT/US2017/048201, the autonomous cart may communicate with a server that manages a local map of the building, the customer website used to direct the cart, and sends commands to the cart. This server may operate on location (e.g., in the warehouse where the carts operate) or be a cloud-based server that is located elsewhere (e.g., a central office far from the warehouse). If desired, the charger may house the server 670 or a wireless access point to a cloud-based server within the charger enclosure. This eliminates the need for a separate box to store the server within the warehouse or other environment.

Electrical Contacts (Piano Fingers)

Figure 7A:
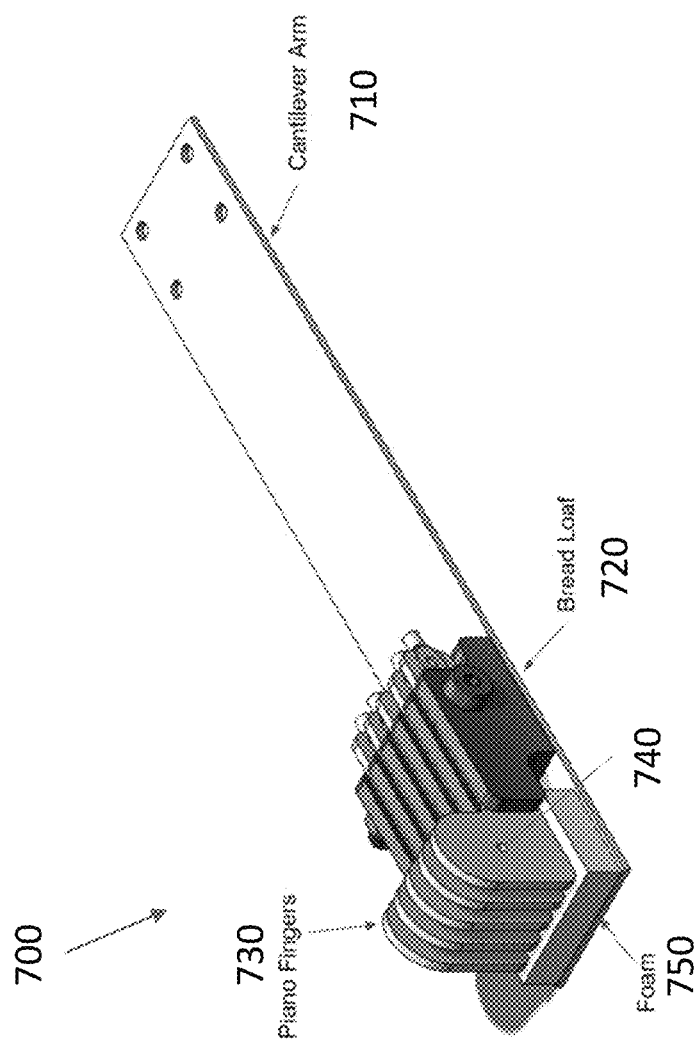
FIG. 7A shows a perspective view of electrical contacts (piano fingers) for a charging station for an autonomous cart.
Figure 7B:
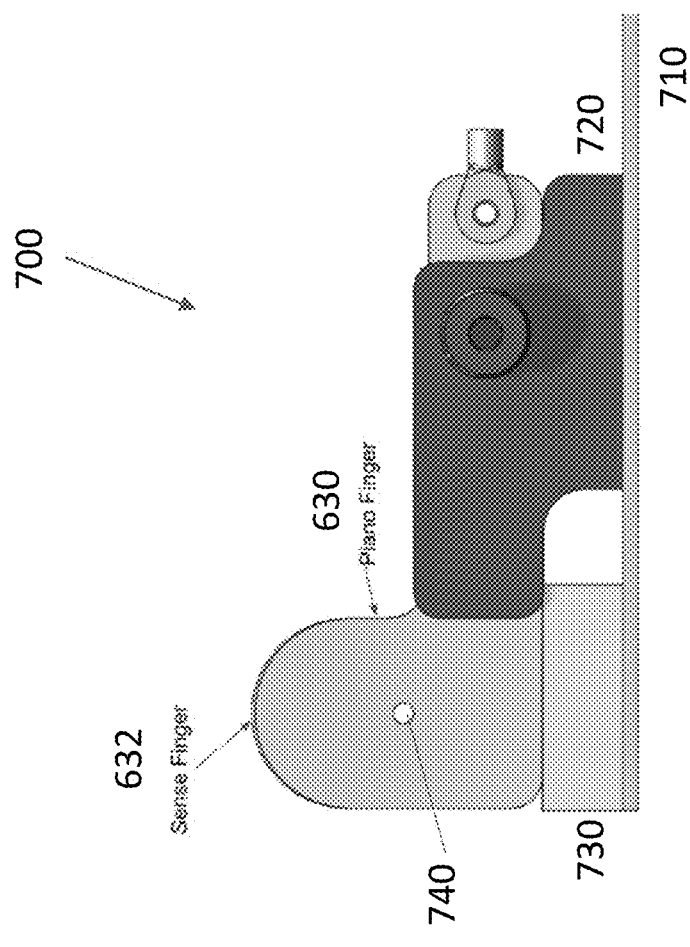
FIG. 7B shows a side view of the electrical contacts (piano fingers) of FIG. 7A.
Figure 8C:
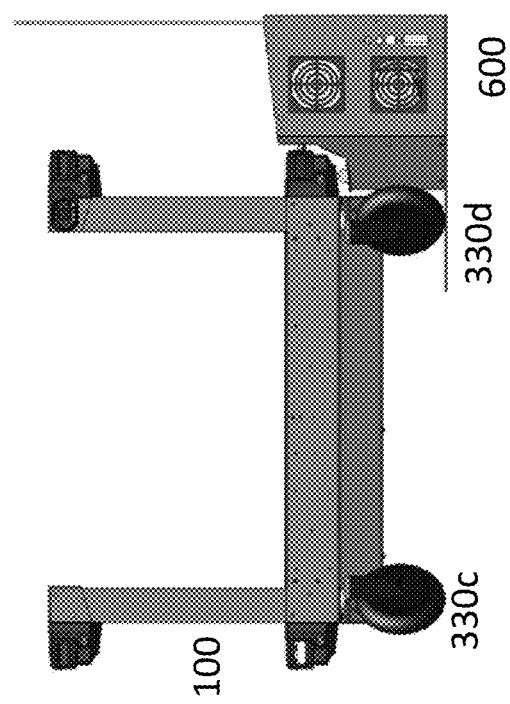
FIG. 8C shows a side view of an autonomous cart parked in front of a charging station in charging position.

FIGS. 7A and 7B show an electrical contact assembly 700 with one instantiation of the charging station's electrical contacts 730. The electrical contact assembly 700 includes brass fingers, called piano fingers 730, with curved (e.g., semi-circular) cross sections that are aligned parallel to each other. When the cart is mated properly to the charger 600, these piano fingers 730 touch the contact plates 130 on the underside of the cart's lower bumper 190 (FIG. 1B).

A milled plastic piece, called a bread loaf 720, holds the fingers in alignment to each other. A pin 740 holds all five piano fingers 730 and the bread loaf 720 together as an assembly. The pin 740 also acts as a pivot point so that each of the five fingers 730 can articulate separately. A foam pad 750 beneath the fingers 730 acts as a spring and provides a rebound force against the fingers 730. The foam pad 750 also deforms to account for differences in displacement of the fingers 730 by the cart's contact plate 130, e.g., if the cart's contact plate is bent, slanted, or otherwise misaligned with respect to the piano fingers 730. In this way, the fingers 730 can accommodate a variety of docking conditions, while ensuring that there are multiple points of contact with the cart's contact plates.

This piano finger assembly (the bread loaf 720, piano fingers 730, pin 740, and foam pad 750) is positioned on the end of a flexible cantilever arm 710. The cantilever arm 710 provides a second level of compliance. As noted above, the cart's contact plate 130 may displace each piano finger 730 by a different amount due to misalignment, imperfections, or both. The foam pad 750 deforms to account for discrepancies in the piano fingers' heights, while the cantilever arm 710 allows the entire piano finger assembly to move up and down. This ensures that the cart 100 can dock and charge successfully regardless of small differences in height due to tolerances or loading conditions. Multiple piano fingers 730 allow for redundancy, increasing the chances of a solid electrical connection with the cart's contact plate 130 even if some of the fingers 730 or some portion of the contact plate 130 is corroded or covered with debris. This makes the piano fingers 730 more robust and reliable over the lifetime of the charger 600.

Sense Fingers

FIGS. 7A and 7B also show that one of the piano fingers 730 is a sense finger 732 that is slightly taller than the other piano fingers. In FIGS. 7A and 7B, the sense finger 732 is the middle piano finger. It is 0.5 mm taller than the other piano fingers 730. Because it is taller than the other piano fingers 730, the sense finger 732 should touch the cart's contact plate 130 under any condition.

The sense finger 732 is used to detect the voltage at the contact pad 130. This voltage can be used to calculate the resistance between the cart 100 and charger 600, providing feedback on the wear of the charger 600 and the cart 100. Before charging starts, the sense finger 732 outputs a low amount of current (e.g., <500 mA) and measures the voltage to yield the resistance through Ohm's law (R=V/I). It may continue this measurement once the charging current is flowing. If the detected resistance is too high, the charger 600 or the cart 100 can alert the user that the piano fingers 730 or contact plates 130 should be cleaned or maintained.

Keeping the contact current of the sense finger 732 low reduces the risk of arcing between the sense finger 732 and the cart's contact plate 130. Arcing could create an insufficient charging connection. A voltage arc could damage the high current output piano fingers 730 or the cart's contact plates 130, making them jagged and uneven, thus compromising the interface between the piano fingers 730 and the contact plates 130. Similarly, a substance buildup or degradation of either the piano fingers 730 or the contact plates 130 may trigger an error that ensures proper maintenance is performed to keep the charger/cart system functioning as desired.

Those of skill in the art will readily appreciate that other electrical configurations are also possible. For instance, the piano fingers can be mounted on the cart instead of on the charger. They can also be replaced by spring-loaded, conductive pins or other conductive elements. Likewise, the proximity sensors can be replaced by or augmented with a spring-loaded latch or spring-loaded plate that is triggered by the cart and that can be locked before and during charging to hold the cart in place and unlocked after charging is complete.

Regulated Output Current Steps

Once the magnetic sensors 610 and the optional momentary switch 620 have been tripped and the sense finger 732 has measured and confirmed a proper connection between the charger 600 and cart 100, the charging sequence begins. In some instances, the Hall effect switches 710 and momentary switch 720 are tripped when the cart is within 2 inches of its proper docking position, but not at greater distances. Rather than immediately connecting its full current output to the cart 100, the charger 600 outputs a limited current level. The charger 600 can select one of several different initial low output current levels according to its preset firmware. This initial low output current level indicates the charger's configuration and the overall charging profile. Based on the initial limited current level, the cart 100 analyzes what the charger 600 is indicating and charges at a level based on the condition of the sensed connection. The cart 100 performs this analysis by way of on-board circuitry (e.g., CPU 218 in FIG. 2) programmed to charge its specific battery type and size. For example, during initial startup of each charge cycle, the charger 100 may output one of five low current levels (e.g., 100 mA, 200 mA, 300 mA, 400 mA, or 500 mA). This low-level current indicates to the cart 100 the current available for charging the cart's battery once the main charge cycle begins. During the main charge cycle, the battery charges at a higher current, e.g., between 3 A to 30 A or between 6 A and 20 A.

Pulse Width Modulation Communication Between the Charger and the Autonomous Cart When the cart and charger are connected to each other, they can communicate with each other via the charging elements 630 (e.g., piano fingers 730). The charger's processor modulates the current on the charging pins, e.g., using a pulse width modulation (PWM) scheme or other suitable modulation scheme. This PWM communication through the main charging connection eliminates the need for any additional communication connections, either through a physical communication protocol connection (rs232, CAN, etc.) or a wireless/network/OTA uplink (e.g., a Bluetooth, Wi-Fi, or infrared connection).

For example, the charger may encode the current with pulses whose widths are modulated to represent what part of the charging cycle is occurring, such as high current, low current, constant current, constant voltage, completed charge, or various types of errors. The cart detects and deciphers this modulation using its on-board circuitry (e.g., CPU 218). The cart can also measure the charge is being received from the charger. If the cart detects a mismatch between a message and the measured charge (e.g., the message indicates high current, but the cart is receiving low current), it may determine that there is fault condition and stop charging and/or issue an alert to a user.

Parking Brake

FIGS. 8A-8D show how the autonomous cart 100 mates with the charging station 600. The cart 100 approaches the charging station 600, either head-on as in FIG. 8A, or at angle or sideways. Once the cart 100 is properly positioned (i.e., after it has actuated the charging station's safety switches), the cart 100 turns its wheels 330 to keep from rolling backwards off the charger 600. Because each wheel 330 can rotate independently about its own (vertical) steering axis, it is possible to turn the wheels 330 such that they are no longer all parallel with each. They can be rotated outwards, as in FIGS. 8B-8D, or inwards. Rotating the wheels 330 is a highly effective and controllable brake which enables emergency and parking brake functions.

Charging Process for an Autonomous Cart

Figure 9:
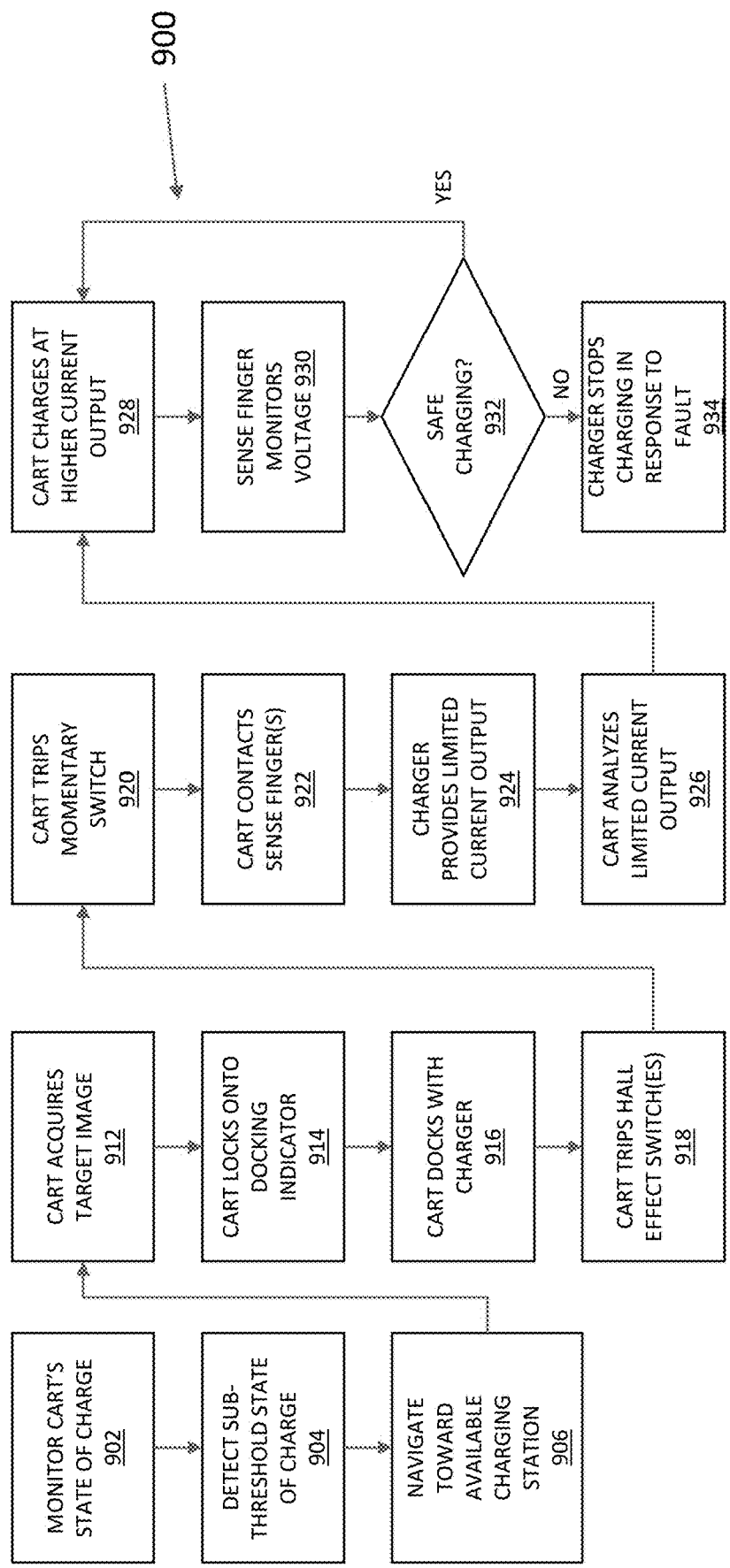
FIG. 9 shows a flow chart that illustrates a charging process for an autonomous cart.

FIG. 9 shows a process 900 for charging an autonomous cart 100 with a charging station 600. A server, which may be in or near the charging station 100, tracks the locations of the chargers in the warehouse or other facility. It also tracks the current allocation status of each charger: a charger is either allocated to a specific autonomous cart or not allocated to any autonomous cart. Using separate logic, the server may change the current set of allocations, e.g., by adding, removing, or replacing allocations of specific carts to specific chargers.

During the cart's normal operation, the cart measures its battery's state of charge and reports this information to the server (step 902). The cart may report the state of charge on a continuous, regular, or irregular basis, e.g., in response to queries from the server, upon reaching certain locations with respect to the charger, or before, during, or after performing certain tasks.

If the server determines that the battery's state of charge is within a predetermined range (e.g., less than 40%, 30%, 20%, or 10% or within a certain percentage of a preset threshold) (step 904) or that the charger's path will bring it close to an available charger, the server plans a path for the cart to a location where the cart's onboard cameras will be capable of observing the charger (step 906). (The cart may also be able to plan this path when operating completely autonomously.) This location can be a specific location or a range of locations/orientations that are known to place the charger in the visual path of the cart and can be specified ahead of time, e.g., using a web-based interface. The cart's orientation at the location may also be specified to increase the chances that the cart's cameras and onboard navigation system will observe and identify the charger.

Once the autonomous cart 100 is near the charging station 600, the autonomous cart 600 uses its binocular vision system to search for and acquire an image of the target on or associated with the charging station 600 (step 912). If the cart observes the charger, the server and/or the cart will attempt to plan a short path that will dock the cart with the charger. If the cart doesn't observe the charger or can't plan a path to the charger (e.g., because of an obstacle between it and the charger), then the process 900 may return to step 902, monitoring the state of charge. Optionally, in step 912, upon identifying the location of the charger, the server may update its understanding of the location of the charger to improve the reliability of future docking attempts Upon acquiring an image of the target, the cart 100 locks onto the target (step 914) and docks with the charger 600 (step 916). As it docks, the cart 100 trips the magnetic sensor (step 918) and, optionally, the momentary switch (step 920) and contacts the sense finger (step 922). The charger 600 senses the tripped sensors and the cart's electrical connection to the sense finger; in response, the charger 600 provides a limited current (e.g., 100 mA to 500 mA) to the cart 100 via the sense finger 632 (step 924). The charger 600 may select this current level based on the resistance of its electrical connection to the cart 100 and the cart's battery. The cart 100 analyzes the limited current (step 926) and uses it to set charging parameters.

The charger 600 charges the cart 100 at a higher current (e.g., 3 A to 30 A) according to the charging parameters (step 928). While charging, the charger 600 monitors the resistance of the connection to the cart via the sensing finger 732 and the status of the Hall effect sensors and momentary switch (step 930). If the charger 600 senses a fault condition (step 932), such as an unactuated sensor or switch, it stops charging (step 934) and issues an alert. If the charger 600 doesn't sense a fault condition, it keeps charging the cart 100 until the cart's power supply has been recharged, at which point the cart 100 drives away from the charging station 600.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A charger for an autonomous robot, the charger comprising:
   a power supply;
   a sensor, operably coupled to power supply, to sense a position of the autonomous robot with respect to the charger;
   a charging element, in electrical communication with the power supply, to charge the autonomous robot with power from the power supply in response to a signal from the sensor indicating that the autonomous robot is positioned to be charged by the charger;
   a visual target, on or in proximity to the charger, wherein the visual target is a physical target that is used by the autonomous robot to guide the autonomous robot to the charger, wherein detection of the visual target triggers a positioning process that is completed when the signal is sent from the sensor, wherein the charger is moveable from a first location to a second location; and
   modulating a current supplied to the autonomous robot by the charger based on a selected initial low current output level so as to transmit information from the charger to the autonomous robot.

2. The charger of claim 1, wherein the sensor comprises:
   a magnetic sensor to sense a magnet in or on the autonomous robot.

3. The charger of claim 1, wherein the sensor comprises:
   a momentary switch, disposed on a side of the charger facing the autonomous robot, to complete a circuit between the power supply and the charging element in response to actuation by the autonomous robot.

4. The charger of claim 1, further comprising:
   a voltage sensing element, in electrical communication with the power supply, to measure a voltage at an electrical contact of the autonomous robot.

5. The charger of claim 1, wherein the charger is configured to stop charging the autonomous robot in response to a fault signal from the sensor, the fault sensor indicating that the autonomous robot is not positioned to be charged by the charger.

6. The charger of claim 1, further comprising:
   a processor, in electrical communication with the charging element, to modulate a current supplied to the autonomous robot via the charging element.

7. The charger of claim 6, wherein the processor is configured to modulate the current based on a charging cycle of the charger.

8. The charger of claim 1, further comprising:
   a resilient member, supporting the charging element, to push the charging element against an electrical contact of the autonomous robot.

9. The charger of claim 8, wherein the resilient member comprises a foam pad supporting the charging element.

10. A method of charging an autonomous robot with a charger, the method comprising:
    initiating a continuous imaging process that comprises acquiring an image of a physical visual target on or in proximity to the charger;
    guiding the autonomous robot to the charger based on the image of the physical visual target;
    sensing that the autonomous robot is positioned to be charged by the charger;
    in response to sensing that the autonomous robot is positioned to be charged by the charger, (i) charging the autonomous robot with the charger, and (ii) ending the continuous imaging process; and
    modulating a current supplied to the autonomous robot by the charger based on a selected initial low current output level so as to transmit information from the charger to the autonomous robot.

11. The method of claim 10, wherein sensing that the autonomous robot is positioned to be charged by the charger comprises:
    sensing a magnet in or on the autonomous robot with a magnetic sensor.

12. The method of claim 10, wherein sensing that the autonomous robot is positioned to be charged by the charger comprises:
    actuating a momentary switch disposed on a side of the charger facing the autonomous robot.

13. The method of claim 10, further comprising:
    measuring a resistance of an electrical connection between the charger and the autonomous robot.

14. The method of claim 13, further comprising:
    sensing corruption or degradation of the electrical connection between the charger and the autonomous robot based on the resistance.

15. The method of claim 10, further comprising:
    wherein the charger is configured to stop charging the autonomous robot in response to a signal indicating that the autonomous robot is not positioned to be charged by the charger.

16. The method of claim 10, wherein modulating the current supplied to the autonomous robot by the charger comprises modulating the current based on a charging cycle of the charger.

17. A method of charging an autonomous robot with a charger, the method comprising:
    sensing that a state-of-charge of a battery of the autonomous robot is within a predetermined range;
    in response to determining that the state-of-charge is within the predetermined range, guiding the autonomous robot to within visual range of the charger;
    initiating a continuous imaging process that comprises acquiring an image of a physical visual target on or in proximity to the charger;
    guiding the autonomous robot to the charger based on the image of the physical visual target;

sensing that the autonomous robot is positioned to be charged by the charger;

in response to sensing that the autonomous robot is positioned to be charged by the charger, (i) supply a current to the autonomous robot from the charger, and (ii) ending the continuous imaging process; and modulating the current supplied by the charger based on a selected initial low current output level so as to transmit information from the charger to the autonomous robot.

* * * * *